US011272111B2

United States Patent
Kimura (10) Patent No.: US 11,272,111 B2
(45) Date of Patent: Mar. 8, 2022

(54) IMAGE PROCESSING APPARATUS (71) Applicant: DENSO CORPORATION, Kariya (JP)

(72) Inventor: Masao Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/882,144

(22) Filed: May 22, 2020

(65) Prior Publication Data

US 2020/0374465 A1 Nov. 26, 2020

(30) Foreign Application Priority Data

May 23, 2019 (JP) .............................. JP2019-096743

(51) Int. Cl.
*H04N 5/232* (2006.01)
*B60R 1/00* (2006.01)

(52) U.S. Cl.
CPC ........... *H04N 5/23296* (2013.01); *B60R 1/00* (2013.01); *B60R 2300/105* (2013.01); *B60R 2300/302* (2013.01); *B60R 2300/605* (2013.01)

(58) Field of Classification Search
CPC .............. H04N 5/232; H04N 5/23238; H04N 5/23296; B60R 1/00; B60R 2300/105; B60R 2300/302; B60R 2300/605
See application file for complete search history.

(56) References Cited

U.S. PATENT DOCUMENTS

| 10,969,237 B1* | 4/2021 | Zhang | G06K 9/6271 |
| 2005/0232469 A1* | 10/2005 | Schofield | B60Q 1/08 |
| | | | 382/104 |
| 2009/0040306 A1* | 2/2009 | Foote | B60R 1/0602 |
| | | | 348/148 |
| 2017/0259753 A1* | 9/2017 | Meyhofer | H04N 13/204 |
| 2017/0357863 A1* | 12/2017 | Tsuruta | G06T 7/254 |
| 2018/0244204 A1* | 8/2018 | Boehm | H04N 5/2253 |

FOREIGN PATENT DOCUMENTS

| JP | 2006-024120 A | | 1/2006 |
| JP | 2006-178652 A | | 7/2006 |
| JP | 2013-108990 A | | 6/2013 |
| JP | 2013108990 A | * | 6/2013 |

\* cited by examiner

*Primary Examiner* — Peet Dhillon
(74) *Attorney, Agent, or Firm* — Maschoff Brennan

(57) ABSTRACT

In an image processing apparatus, a vehicle speed obtainer obtains vehicle speed information indicative of a speed of a vehicle. A deactivation controller determines whether the speed of the vehicle represented by the vehicle speed information is equal to or lower than a speed-related deactivation threshold previously determined for a target device. The target device is a selected one of first and second imaging devices. The selected one of the first and second imaging devices has one of first and second angular fields of view smaller than the other of the first and second angular fields of view. The deactivation controller deactivates a capture operation of the target device upon determination that the speed of the vehicle represented by the vehicle speed information is equal to or lower than the speed-related deactivation threshold previously determined for the target device.

9 Claims, 4 Drawing Sheets

IMAGE PROCESSING APPARATUS

CROSS REFERENCE TO RELATED APPLICATION

This application is based on and claims the benefit of priority from Japanese Patent Applications No. 2019-096743 filed on May 23, 2019, the disclosure of which is incorporated in its entirety herein by reference.

TECHNICAL FIELD

The present disclosure relates to image processing apparatuses for performing, based on image data captured from an imaging device installed to a vehicle, an image-processing task.

BACKGROUND

Front monitoring camera modules installable in a vehicle manipulate a larger amount of data therein as the number of pixels of an image captured by the camera modules increases and/or functions executable by the camera modules increase.

SUMMARY

An image processing apparatus according to an exemplary aspect of the present disclosure includes a vehicle speed obtainer that obtains vehicle speed information indicative of a speed of a vehicle. The image processing apparatus includes a deactivation controller that determines whether the speed of the vehicle represented by the vehicle speed information is equal to or lower than a speed-related deactivation threshold previously determined for a target device. The target device is a selected one of first and second imaging devices. The target device has one of first and second angular fields of view smaller than the other of the first and second angular fields of view. The deactivation controller deactivates a capture operation of the target device upon determination that the speed of the vehicle represented by the vehicle speed information is equal to or lower than the speed-related deactivation threshold previously determined for the target device.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

VIEW POINT

Front monitoring camera modules installable in a vehicle manipulate a larger amount of data therein as the number of pixels of an image captured by the camera modules increases and/or functions executable by the camera modules increase. An increase in the amount of data manipulated by such a camera module increases electric power consumed by the camera module. This results in an increase of heat generated by such a camera module. It is necessary for such a camera module to prevent the temperature of the camera module from exceeding upper limit temperatures of devices installed in the camera module.

On the other hand, Japanese Patent Application Publication No. 2006-24120 discloses an image processing apparatus that exclusively activates, based on a speed of a vehicle, any one of a wide-angle camera with a wide-angle lens and a telephoto camera with a telephoto lens.

The image processing apparatus disclosed in the above patent publication exclusively activates the telephoto camera while the vehicle is travelling on an expressway.

The image processing apparatus therefore may make it difficult to use the wide-angle camera while the vehicle is travelling on an expressway, resulting in a reduction in image processing performance of the image processing apparatus.

From this viewpoint, the present disclosure seeks to provide image processing apparatuses, each of which is capable of improving image processing performance thereof while reducing heat generated by an imaging device of the image processing apparatus.

An image processing apparatus according to a first exemplary aspect of the present disclosure, which is communicable with at least first and second imaging devices installed to a vehicle, is for performing an image processing task based on first image data and second image data. Each of the first image data and second image data is obtained by a capture operation of the corresponding one of the first and second imaging devices with use of a corresponding one of first and second angular fields of view different from each other. The image processing apparatus includes a vehicle speed obtainer configured to obtain vehicle speed information indicative of a speed of the vehicle, and a deactivation controller.

The deactivation controller is configured to determine whether the speed of the vehicle represented by the vehicle speed information is equal to or lower than a speed-related deactivation threshold previously determined for a target device. The target device is a selected one of the first and second imaging devices, and the selected one of the first and second imaging devices has one of the first and second angular fields of view smaller than the other of the first and second angular fields of view. The deactivation controller is configured to deactivate the capture operation of the target device upon determination that the speed of the vehicle represented by the vehicle speed information is equal to or lower than the speed-related deactivation threshold previously determined for the target device.

A computer-readable storage medium includes a set of computer program instructions for a computer applicable to an image processing apparatus communicable with at least first and second imaging devices installed to a vehicle. The image processing apparatus is configured to perform an image processing task based on first image data and second image data, each of the first image data and second image data being obtained by a capture operation of the corresponding one of the first and second imaging devices with use of a corresponding one of first and second angular fields of view different from each other. The instructions cause a computer to carry out 1. A first step of obtaining vehicle speed information indicative of a speed of the vehicle
2. A second step of determining whether the speed of the vehicle represented by the vehicle speed information is equal to or lower than a speed-related deactivation threshold previously determined for a target device, the target device being a selected one of the first and second imaging devices, the selected one of the first and second imaging devices having one of the first and second angular fields of view smaller than the other of the first and second angular fields of view
3. A third step of deactivating the capture operation of the target device upon determination that the speed of the vehicle represented by the vehicle speed information is equal to or lower than the speed-related deactivation threshold previously determined for the target device Upon it being determined that the speed of the vehicle is equal to or lower than the speed-related deactivation threshold for the target device, each of the image processing method and apparatus is configured to deactivate the target device. This configuration makes it possible to prevent, in accordance with the speed of the vehicle, the target device, which has little need to be activated, from performing the capture operation, thus reducing the amount of heat generated by the target device.

EMBODIMENT

The following describes an exemplary embodiment of the present disclosure with reference to the accompanying drawings. Note that the exemplary embodiment merely represents an example of the present disclosure, and does not limit the present disclosure to the following specific configuration of the exemplary embodiment. Modification of the following specific configuration may be adopted based on the present disclosure.

Figure 1:
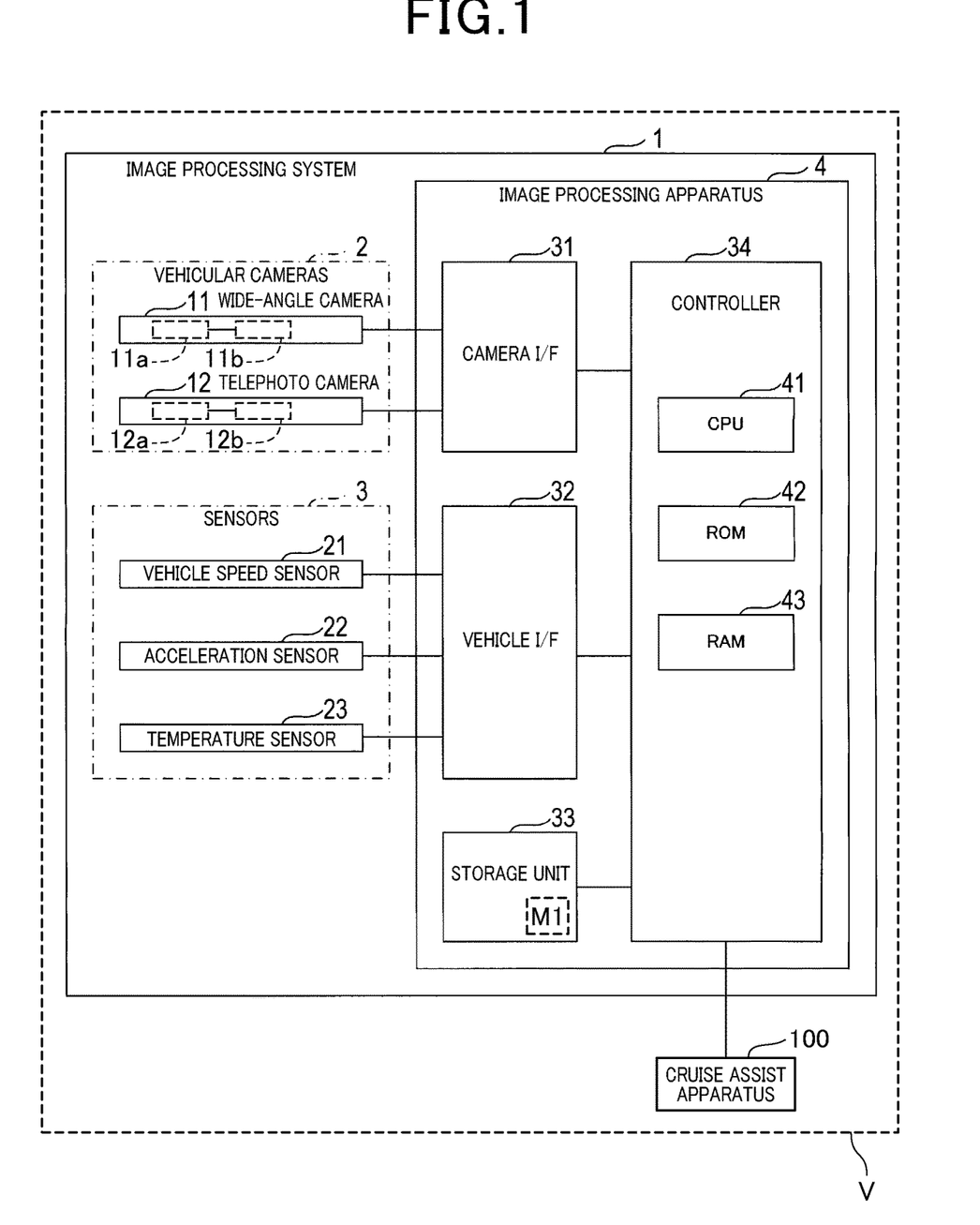
FIG. 1 is a block diagram schematically illustrating an example of the configuration of an image processing system according to an exemplary embodiment of the present disclosure.

FIG. 1 schematically illustrates an example of the specific configuration of an image processing system 1 according to the exemplary embodiment of the present disclosure. The image processing system 1 is installed to an own vehicle V.

Referring to FIG. 1, the image processing system 1 includes vehicular cameras 2, sensors 3, and an image processing apparatus 4.

The vehicular cameras 2 include, for example, a wide-angle camera 11 and a telephoto camera 12. For example, the wide-angle camera 11 and telephoto camera 12 are mounted to the front of the own vehicle V. Each of the wide-angle camera 11 and telephoto camera 12 is configured to perform a capture operation to thereby sequentially capture images of a corresponding front view field, which corresponds to a front imaging region, with respect to the own vehicle V.

The wide-angle camera 11 is comprised of a wide-angle view lens 11a having a first angular field of view, i.e. a substantially 180° diagonal angular field of view, and is therefore capable of capturing images each having the 180° diagonal angular field of view.

In contrast, the telephoto camera 12 is comprised of a telephoto lens 12a having, for example, a second angular field of view, i.e. a diagonal angular field of view narrower than the 180° diagonal angular field of view, and is capable of capturing images each zooming in on a distant object.

Note that a horizontal angular field of view and/or a vertical angular field of view of a camera can be used in place of or in addition to the diagonal angular field of view of the camera.

Each of the wide-angle camera 11 and telephoto camera 12 is configured as a digital camera comprised of an imager 11b and 12b, such as a CCD image sensor or a CMOS image sensor, and the corresponding one of the wide-angle lens 11a and the telephoto lens 12a.

The imager 11b, 12b of each of the cameras 11 and 12 is comprised of a plurality of light receiving elements, i.e. CCD image-sensor elements or CMOS image-sensor elements, which respectively correspond to a plurality of pixels, two-dimensionally arranged in both vertical and horizontal directions corresponding to the respective height direction and width direction of the vehicle V.

Figure 4A:
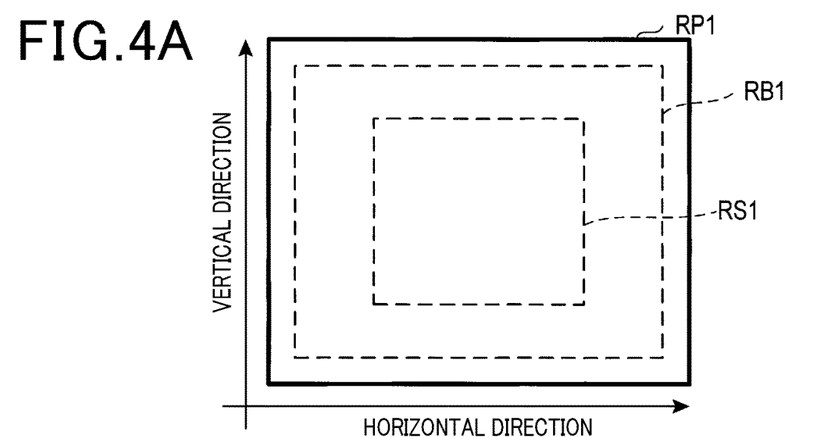
FIG. 4A is a plan view schematically illustrating a light receiving surface of an imager of a wide-angle camera illustrated in FIG. 1.
Figure 4B:
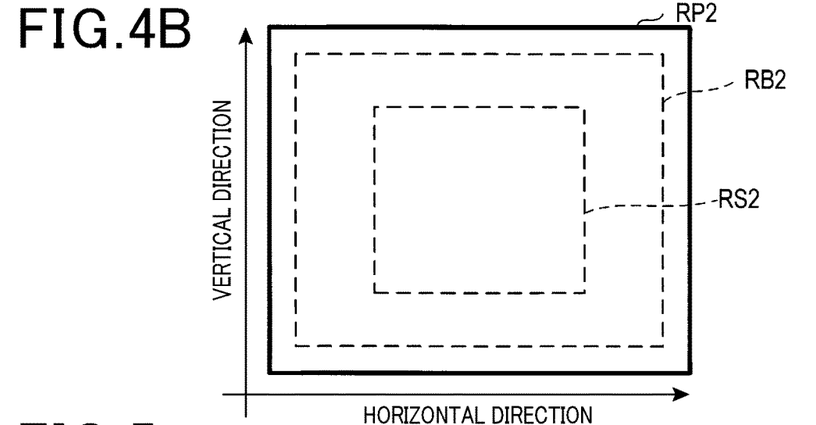
FIG. 4B is a plan view schematically illustrating a light receiving surface of an imager of a telephoto camera illustrated in FIG. 1.

The two-dimensionally arranged pixels constitute a rectangular or square light receiving surface RP1, RP2 of the imager 11b, 12b. That is, the imager 11b of the camera 11 has a light receiving surface RP1 (see FIG. 4 described later), and the imager 12b of the camera 12 has a light receiving surface RP2 (see FIG. 4 described later).

The lens 11a, 12a of each camera 11, 12 focuses light incident from, for example, the corresponding imaging region on the light receiving surface RP1, RP2 of the corresponding imager 11b, 12b. The imager 11b, 12b of each camera 11, 12 receives light focused on the light receiving surface RP1, RP2 thereof, so that each of the two-dimensionally arranged light-sensitive elements (pixels) receives a corresponding light component.

Then, the imager 11b, 12b of each camera 11, 12 converts, using each of the light receiving elements, the intensity or luminance level for each of red, green, and blue (RGB) of a corresponding received light component into an analog pixel value or an analog pixel signal that is proportional to the luminance level of the corresponding received light component; the analog pixel values of all the pixels, i.e. light receiving elements, constitute an analog frame image.

Then, the imager 11b, 12b of each camera 11, 12 is configured to convert the analog pixel signals (analog pixel values) of the analog frame image into digital pixel signals (digital pixel values) based on a predetermined bit width, i.e. the number of bits, thus outputting, to the image processing apparatus 4, image data including a digital frame image comprised of two-dimensionally arranged pixels, each of which has a corresponding digital pixel value. This enables the image processing apparatus 4 to perform various image-processing tasks of the digital frame images sent from the respective cameras 11 and 12.

That is, the digital pixel value of each pixel of a digital frame image captured by a camera 11 or 12 is comprised of the predetermined number of bits that represents a corresponding luminous level and a corresponding chromaticity value based on corresponding RGB levels.

Note that each camera 11, 12 can be configured to send, to the image processing apparatus 4, the analog frame image, and the image processing apparatus 4 can be configured to convert the analog frame image into the digital frame image.

In particular, the number of pixels of the imager 11b and the number of pixels of the imager 12b are set to be identical to each other.

The sensors 3 include, for example, a vehicle speed sensor 21, an acceleration sensor 22, a temperature sensor 23.

The vehicle speed sensor 21 is configured to measure a value of the speed of the own vehicle V, and send a speed measurement signal indicative of the value of the speed of the own vehicle V to the image processing apparatus 4.

The acceleration sensor 22 is configured to measure a value of acceleration acting on the own vehicle V, and send an acceleration measurement signal indicative of the value of the acceleration of the own vehicle V to the image processing apparatus 4.

The temperature sensor 23 is configured to measure a value of the temperature of the telephoto camera 12, and send a temperature measurement signal indicative of the value of the temperature of the telephoto camera 12 to the image processing apparatus 4.

The image processing apparatus 4 includes a camera interface (I/F) 31, a vehicle interface (I/F) 32, a storage unit 33, and a controller 34. The components 31, 32, and 33 is configured to be communicable with the controller 34. The components 31 to 33 can be configured to be communicable with each other.

The camera interface 31 enables the controller 34 of the image processing apparatus 4 to communicate with each of the wide-angle camera 11 and telephoto camera 12. Specifically, the camera interface 31 is configured to receive, from each of the wide-angle camera 11 and telephoto camera 12, the corresponding image data each time the corresponding image data is sent from each of the cameras 11 and 12; the image data is comprised of the digital frame image. Then, the camera interface 31 is configured to input the image data sent from each of the cameras 11 and 12 to the controller 34.

The vehicle interface 33 is configured to receive the measurement signal sent from each of the sensors 21, 22, and 23, and input the measurement signal sent from each of the sensors 21, 22, and 23 to the controller 34.

The storage unit 33 is capable of strong various types of data.

The controller 34 is for example comprised of a known microcomputer including at least a CPU 41 and a memory unit including, for example, a ROM 42 and a RAM 43.

The CPU 41 includes various functions for performing overall control of the image processing apparatus 4. Various programs, i.e. program instructions, for causing the CPU 41 to perform the various functions, i.e. various routines, are stored in, for example, the ROM 42 of the memory unit; the ROM 42 serves as, for example, a non-transitory tangible storage media. In addition, various data items usable by the CPU 41 are also stored in, for example, the RAM 43 of the memory unit.

The controller 34 can be comprised of plural microcomputers, i.e. processors.

Note that at least part of all the functions provided by the controller 34 can be implemented by at least one processor; the at least one processor can be comprised of (1) The combination of at least one programmed processing unit, i.e. at least one programmed logic circuit, and at least one memory including software that causes the at least one programmed logic circuit to implement all the functions (2) At least one electronic circuit, which includes at least one of a hardwired logic circuit and an analog circuit, for implementing all the functions (3) At least one hybrid circuit, which is comprised of at least one programmable processing unit and at least one electronic circuit, for implementing all the functions In particular, the controller 34 is configured to perform, for example, an image recognition routine, a camera activation/deactivation control routine, an angular field of view control routine, and a period control routine based on the image data, i.e. digital frame image, sent from each of the cameras 11 and 12.

The controller 34, i.e. the CPU 41, is configured to perform the image recognition routine every predetermined period; the period will be referred to as an execution period.

The image recognition routine is configured to

1. Determine, based on the image data, i.e. digital frame image, received from each of the cameras 11 and 12, whether at least one target object is included in the digital frame image received from at least one of the cameras 11 and 12

2. Perform a recognition task of recognizing the at least one target object included in the digital frame image upon determination that the at least one target object is included in the digital frame image received from at least one of the cameras 11 and 12

Then, the controller 34 is configured to send, to a cruise assist apparatus 100 installed to the own vehicle V, a result of the recognition task.

For example, the controller 34 performs the recognition task of recognizing, as the at least one target object included in the digital frame image received from at least one of the cameras 11 and 12, (i) lane markers of a road on which the own vehicle V is travelling, (ii) pedestrians, (iii) movable object, such as the other vehicles, bicycles, two-wheel vehicles, and (iv) stationary objects, such as traffic lights and/or traffic signs.

For example, the controller 34 is configured to perform pattern matching of the digital frame image received from each of the cameras 11 and 12 with each of feature patterns stored in, for example, the storage unit 33 to thereby determine whether the at least one target image is included in the digital frame image received from each of the cameras 11 and 12.

As another example, the controller 34 is configured to perform a task of recognizing the at least one target object included in the digital frame image received from at least one of the cameras 11 and 12 in accordance with learning models stored in the storage unit 33. The learning models, which respectively serves as, for example, comparative reference tensors, previously obtained for respective plural types of target objects to be recognized by the controller 34. Each of the learning models has been prepared for the corresponding one of the types of target objects based on a known available learning algorithm, such as a Support Vector Machine (SVM) model. The SVM model for example consists of a plurality of classifiers that are connected to one another in a predetermined connection pattern, such as a cascade connection pattern. Like a known neural-network algorithm, connection weight parameters between the classifiers are set to given values; the values of the connection weight parameters have been trained.

The cruise assist apparatus 100 receives the result of the recognition task sent from the controller 34, i.e. the image processing apparatus 4. The cruise assist apparatus 100 is configured to perform, based on the result of the recognition task, a cruise assist task including, for example, at least one of 1. Automatic braking of the own vehicle V
2. Automatic steering of the own vehicle V
3. Lane keeping of the own vehicle V, which keeps the own vehicle V within a target lane
4. Outputting of warning for occupant(s) in the own vehicle V using one or more output devices including a display and a speaker Next, the following describes the camera activation/deactivation control routine carried out by the CPU 41 with reference to the flowchart of FIG. 2. That is, the CPU 41 is programmed to execute a cycle of the camera activation/deactivation control routine in response to activation of the controller 34 upon electrical energy being supplied from, for example, a power source of the own vehicle V.

Figure 2:
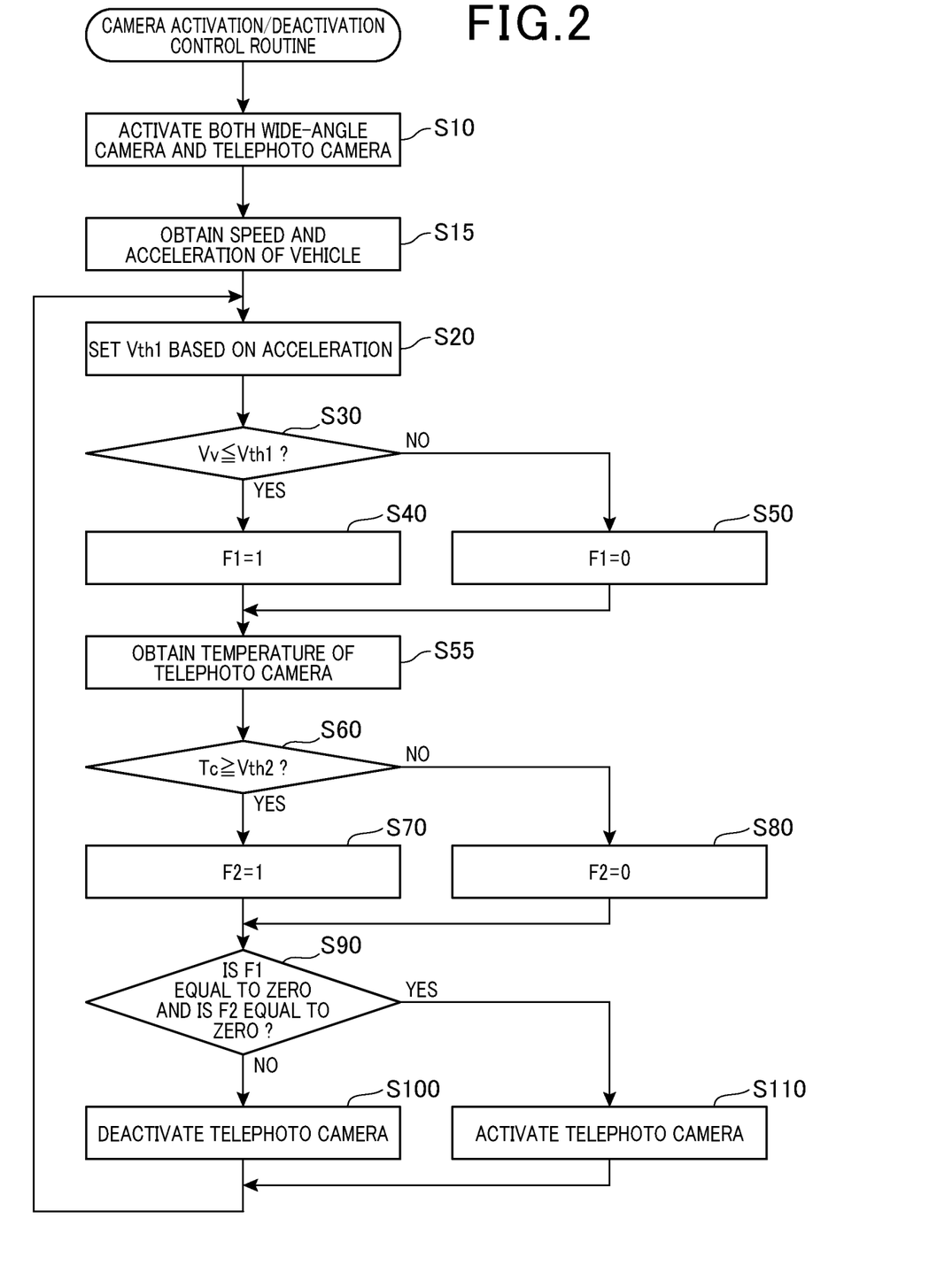
FIG. 2 is a flowchart schematically illustrating a camera activation/deactivation control routine carried out by a CPU of an image processing apparatus illustrated in FIG. 1.

When starting the camera activation/deactivation control routine, the CPU 41 activates each of the wide-angle camera 11 and telephoto camera 12 in step S10 of the flowchart illustrated in FIG. 2. This causes each of the wide-angle camera 11 and telephoto camera 12 to start a capture operation of sequentially capturing images of the corresponding front view field.

Next, in step S15, the CPU 41 serves as, for example, a vehicle speed obtainer and an acceleration obtainer configured to obtain, via the vehicle interface 32, 1. The speed of the own vehicle V, which will be referred to as a vehicle speed Vv hereinafter, represented by the speed measurement signal received from the vehicle speed sensor 21

2. The acceleration of the own vehicle V represented by the acceleration measurement signal received from the acceleration sensor 22

Note that the speed measurement signal serves as, for example, vehicle speed information, and the acceleration measurement signal serves as, for example, acceleration information.

Then, the CPU 41 serves as, for example, a threshold setter configured to set a deactivation threshold Vth1 for the speed of the own vehicle V, which will be referred to as a first deactivation speed threshold Vth1, in accordance with the acceleration of the own vehicle V represented by the acceleration measurement signal received from the acceleration sensor 22 in step S20.

Specifically, the storage unit 33 stores a threshold setting map M1 in data-table format, in mathematical expression format, and/or program format. The threshold setting map M1 includes a correlation indicative of a correlation between (1) Values of the acceleration of the own vehicle V represented by the acceleration measurement signal received from the acceleration sensor 22

(2) Corresponding values of the speed-related deactivation threshold Vth1

In particular, the threshold setting map M1 is configured such that the speed-related deactivation threshold Vth1 has a negative correlation with respect to the acceleration of the own vehicle V.

That is, the negative correlation represents that a value of the speed-related deactivation threshold Vth1 decreases stepwise or sequentially as the acceleration of the own vehicle V increases.

The threshold setting map M1 can be stored in the memory unit.

Following the operation in step S20, the CPU 41 determines whether the vehicle speed Vv represented by the speed measurement signal received from the vehicle speed sensor 21 is equal to or lower than the speed-related deactivation threshold Vth1 in step S30.

Upon determining that the vehicle speed Vv is equal to or lower than the speed-related deactivation threshold Vth1 (YES in step S30), the CPU 41 sets a speed stop flag F1 previously stored in the RAM 43 in step S40, and thereafter the camera activation/deactivation control routine proceeds to step S55.

Note that a flag used in the specification, such as the speed stop flag F1, is, for example, a bit having a logical high level, represented by 1, or a logical low level, represented by 0. Setting a flag represents assigning the flag to the high level of 1 or maintain the flag in the high level of 1, and clearing a flag represents assigning the flag to the low level of 0 or maintaining the flag in the low level of 0. The initial value of a flag used in the specification is set to the low level of 0.

Otherwise, upon determining that the vehicle speed Vv is higher than the speed-related deactivation threshold Vth1 (NO in step S30), the CPU 41 clears the speed stop flag F1 in step S50, and thereafter the camera activation/deactivation control routine proceeds to step S55.

In step S55, the CPU 60 serves as, for example, a temperature obtainer configured to obtain, via the vehicle interface 32, the temperature, which will be referred to as Tc, represented by the temperature measurement signal received from the temperature sensor 23. Note that the temperature measurement signal serves as, for example, temperature information.

Then, the CPU 41 determines whether a value of the temperature Tc represented by the temperature measurement signal received from the temperature sensor 23 is equal to or higher than a temperature-related deactivation threshold Vth2.

Upon determining that the value of the temperature Tc is equal to or higher than the temperature-related deactivation threshold Vth2 (YES in step S60), the CPU 41 sets a temperature stop flag F2 previously stored in the RAM 43 in step S60, and thereafter the camera activation/deactivation control routine proceeds to step S90.

Otherwise, upon determining that the value of the temperature Tc is lower than the temperature-related deactivation threshold Vth2 (NO in step S60), the CPU 41 clears the temperature stop flag F2 in step S80, and thereafter the camera activation/deactivation control routine proceeds to step S90.

In step S90, the CPU 41 determines whether each of the speed stop flag F1 and the temperature stop flag F2 has been cleared to 0, i.e. is in the low level of 0.

Upon determining that at least one of the speed stop flag F1 and the temperature stop flag F2 has been set to 1, i.e. is in the high level of 1 (NO in step S90), the CPU 41 deactivates the capture operation of the telephoto camera 12, i.e. deactivates the telephoto camera 12, or maintains the deactivated state of the telephoto camera 12 in step S100, and returns to the operation in step S20.

Otherwise, upon determining that both the speed stop flag F1 and the temperature stop flag F2 have been cleared to 0, i.e. are in the low level of 0 (YES in step S90), the CPU 41 maintains the activated state of the telephoto camera 12 in step S110, and returns to the operation in step S20.

Note that the CPU 41 can be configured to deactivate the telephoto camera 12 upon determining that the speed stop flag F1 has only been cleared to 0 in step S100 or that the temperature stop flag F2 has only been cleared to 0 in step S100.

Figure 3:
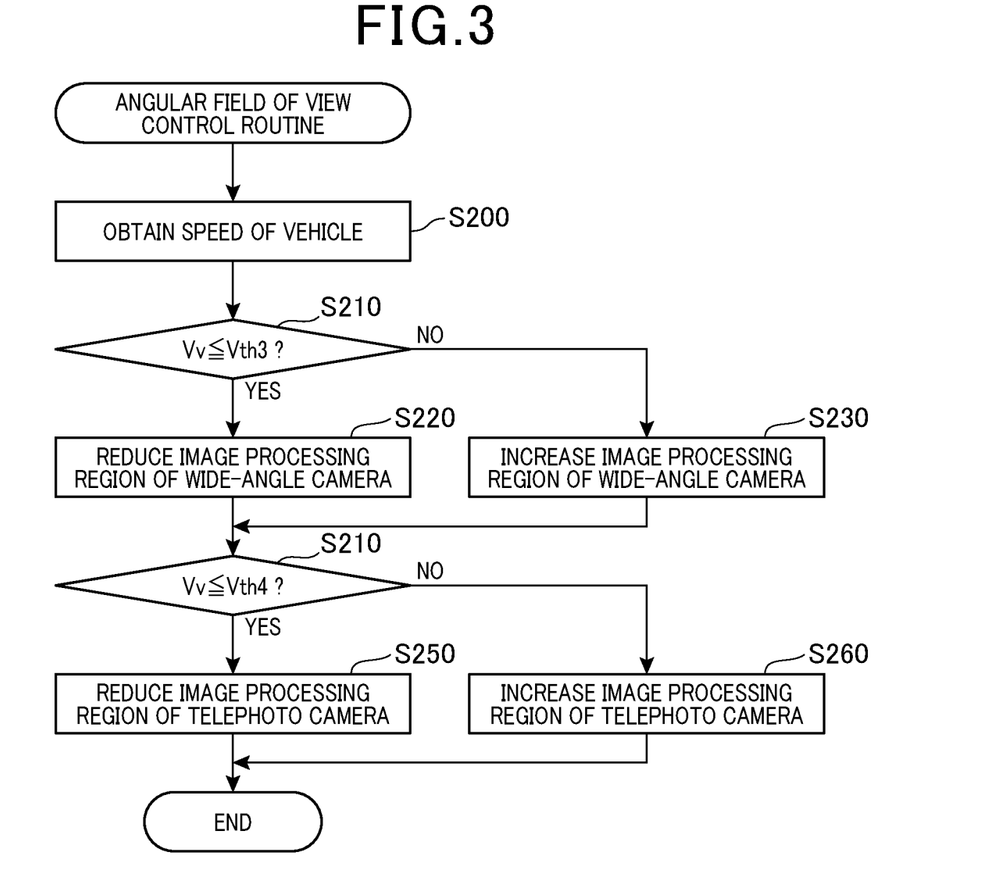
FIG. 3 is a flowchart schematically illustrating an angular field of view control routine carried out by the CPU of the image processing apparatus illustrated in FIG. 1.

Next, the following describes the angular field of view control routine carried out by the CPU 41 with reference to the flowchart of FIG. 3. That is, the CPU 41 is programmed to cyclically or repeatedly execute a cycle of the angular field of view control routine while the controller 34 is operating.

When starting the angular field of view control routine, the CPU 41 serves as, for example, the vehicle speed obtainer configured to obtain, via the vehicle interface 32, the vehicle speed Vv represented by the speed measurement signal received from the vehicle speed sensor 21 in step S200.

Next, the CPU 41 determines whether the vehicle speed Vv represented by the speed measurement signal received from the vehicle speed sensor 21 is equal to or lower than a predetermined angular-field threshold Vth3 in step S210 of the flowchart illustrated in FIG. 3.

Upon determining that the vehicle speed Vv is equal to or lower than the angular-field threshold Vth3 (YES in step S210), the CPU 41 reduces an actual image processing region of the wide-angle camera 11 to a smaller image processing region or maintains the smaller image processing region in step S220, and thereafter the angular field of view control routine proceeds to step S240.

Otherwise, upon determining that the vehicle speed Vv is higher than the angular-field threshold Vth3 (NO in step S210), the CPU 41 increases the actual image processing region of the wide-angle camera 11 to a larger image processing region or maintains the larger image processing region in step S230, and thereafter the angular field of view control routine proceeds to step S240.

Specifically, FIG. 4A schematically illustrates the light receiving surface RP1 of the imager 11*b* of the wide-angle camera 11. In the light receiving surface RP1, a small angular-field clip region, i.e. a readout region, RS1 and a large angular-field clip region, i.e. a readout region, RB1 are previously set.

As described above, the light receiving surface RP1 is comprised of the pixels two-dimensionally arranged in both the vertical and horizontal directions. For example, the small angular-field clip region RS1 has a rectangular or square shape having the same center as a center of the light receiving surface RP1. Similarly, the large angular-field clip region RB1 has a rectangular or square shape having the same center as a center of the light receiving surface RP1.

The area, i.e. size, of the large angular-field clip region RB1 is larger, i.e. wider, than the area, i.e. size of the smaller angular-field clip region RS1. That is, the number of pixels in the smaller angular-field clip region RS1 is smaller than the number of pixels in the larger angular-field clip region RB1.

The wide-angle camera 11 is configured to read out image data, a digital image, included in the smaller angular-field clip region RS1 upon the smaller angular-field clip region RS1 being set as an output region of the imager 11*b*. This results in the image processing region of the wide-angle camera 11 being reduced.

In contrast, the wide-angle camera 11 is configured to read out image data, a digital image, included in the larger angular-field clip region RB1 upon the larger angular-field clip region RB1 being set as the output region of the imager 11*b*. This results in the image processing region of the wide-angle camera 11 being increased.

Specifically, the CPU 41 sets the output region of the imager 11*b* to the smaller angular-field clip region RS1 to thereby reduce the image processing region of the wide-angle camera 11 to the smaller image processing region or maintain the smaller image processing region in step S220. Otherwise, the CPU 41 sets the output region of the imager 11*b* to the larger angular-field clip region RB1 to thereby increase the image processing region of the wide-angle camera 11 to the larger image processing region or maintain the larger image processing region in step S230.

Following the operation in step S220 or S230, the CPU 41 determines whether the vehicle speed Vv is equal to or lower than a predetermined telephoto angular-field threshold Vth4 in step S240.

Upon determining that the vehicle speed Vv is equal to or lower than the telephoto angular-field threshold Vth4 (YES in step S240), the CPU 41 reduces an image processing region of the telephoto camera 12 to a smaller image processing region or maintains the smaller image processing region in step S250, and thereafter terminates the angular field of view control routine.

Otherwise, upon determining that the vehicle speed Vv is higher than the telephoto angular-field threshold Vth4 (NO in step S240), the CPU 41 increases the image processing region of the telephoto camera 12 to a larger image processing region or maintains the larger image processing region in step S260, and thereafter terminates the angular field of view control routine.

Specifically, FIG. 4B schematically illustrates the light receiving surface RP2 of the imager 12*b* of the telephoto camera 12. In the light receiving surface RP2, a small angular-field clip region RS2 and a large angular-field clip region RB2 are previously set.

As described above, the light receiving surface RP2 is comprised of the pixels two-dimensionally arranged in both the vertical and horizontal directions. For example, the small angular-field clip region RS2 has a rectangular or square shape having the same center as a center of the light receiving surface RP2. Similarly, the large angular-field clip region RB2 has a rectangular or square shape having the same center as a center of the light receiving surface RP2.

The area, i.e. size, of the large angular-field clip region RB2 is larger, i.e. wider, than the area, i.e. size of the smaller angular-field clip region RS2. That is, the number of pixels in the smaller angular-field clip region RS2 is smaller than the number of pixels in the larger angular-field clip region RB2.

The telephoto camera 12 is configured to output image data, a digital image, included in the smaller angular-field clip region RS2 upon the smaller angular-field clip region RS2 being set as an output region of the imager 12*b*. This results in the image processing region of the telephoto camera 12 being reduced.

In contrast, the telephoto camera 12 is configured to output image data, a digital image, included in the larger angular-field clip region RB2 upon the larger angular-field clip region RB2 being set as the output region of the imager 12*b*. This results in the image processing region of the telephoto camera 12 being increased.

Specifically, the CPU 41 sets the output region of the imager 12*b* to the smaller angular-field clip region RS2 to thereby reduce the image processing region of the telephoto camera 12 to the smaller image processing region or maintain the smaller image processing region in step S260. Otherwise, the CPU 41 sets the output region of the imager 12*b* to the larger angular-field clip region RB2 to thereby increase the image processing region of the telephoto camera 12 to the larger image processing region or maintain the larger image processing region in step S260. Thereafter, the CPU 41 terminates the angular field of view control routine.

Figure 5:
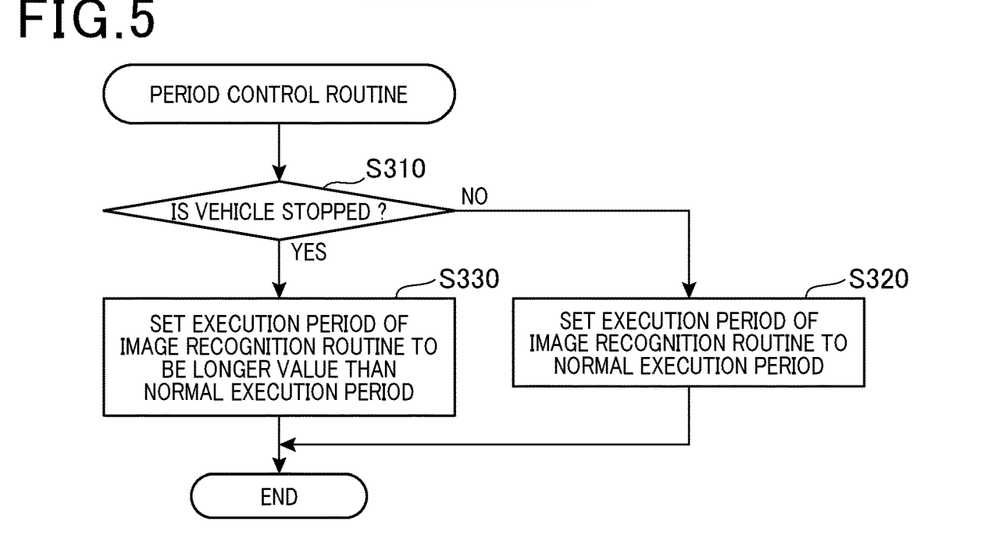
FIG. 5 is a flowchart schematically illustrating a period control routine carried out by the CPU of the image processing apparatus illustrated in FIG. 1.

Next, the following describes the period control routine carried out by the CPU 41 with reference to the flowchart of FIG. 5. That is, the CPU 41 is programmed to cyclically or repeatedly execute a cycle of the period control routine while the controller 34 is operating.

When starting the period control routine, the CPU 41 determines whether the own vehicle V is stopped based on the vehicle speed Vv represented by the speed measurement signal received from the vehicle speed sensor 21 in step S310 of the flowchart illustrated in FIG. 5.

Upon determining that the own vehicle V is not stopped (NO in step S310), the CPU 41 sets the execution period of the image recognition routine to a predetermined normal execution period of, for example, 100 milliseconds (ms) in step S320, and thereafter, terminates the period control routine.

Otherwise, determining that the own vehicle V is stopped (YES in step S310), the CPU 41 sets the execution period of the image recognition routine to a predetermined stoppage execution period of, for example, 200 (ms), which is longer than the normal execution period in step S330, and thereafter, terminates the period control routine.

As described above, the image processing apparatus 4 is configured to perform the image processing routine based on (i) the image data obtained from the wide-angle camera 11 and (ii) the image data obtained from the telephoto camera 12. The wide-angle camera 11 captures an outer directional view from the own vehicle V using the first angular field of view, and the telephoto camera 12 captures an outer directional view from the own vehicle V using the second angular field of view narrower than the first angular field of view.

Additionally, the image processing apparatus 4 is configured to obtain, from the vehicle speed sensor 21, the speed measurement signal, and determine whether the vehicle speed Vv indicated by the speed measurement signal is equal to or lower than the speed-related deactivation threshold Vth1.

A value of the speed-related deactivation threshold Vth1 is set to be suitable for the telephoto camera 12 having the second angular field of view; the telephoto camera 12 is one of the vehicular cameras 2 except for the wide-angle camera 11 having the largest angular field of view in all the vehicular cameras 2.

Specifically, if the vehicular cameras 2 include, in addition to the wide-angle camera 11 and the telephoto camera 12, a third camera having a third angular field of view that is smaller than the first field of view of the wide-angle camera 11, and larger than the second angular field of view of the telephoto camera 12. At that time, a value of the speed-related deactivation threshold Vth1 for the third camera is set to be smaller than a value of the speed-related deactivation threshold Vth1 for the telephoto camera 12.

Specifically, the speed-related deactivation threshold Vth1 has a negative correlation with respect to an increase in angular field of view among cameras in the vehicular cameras 2 installed to the own vehicle V. Note that the speed-related deactivation threshold Vth1 can have a negative correlation with respect to the second angular field of view of the telephoto camera 12.

Upon determining that the vehicle speed Vv indicated by the speed measurement signal is equal to or lower than the speed-related deactivation threshold Vth1 uniquely set for the telephoto camera 21, the image processing apparatus 4 is configured to deactivate the telephoto camera 12. This configuration makes it possible to prevent, in accordance with the vehicle speed Vv, the telephoto camera 12, which has little need to be activated, from capturing images, thus reducing the amount of heat generated by the telephoto camera 12.

Additionally, the image processing apparatus 4 is configured to be capable of simultaneously activating the wide-angle camera 11, which has the largest angular field of view in all the vehicular cameras 2, and the telephoto camera 12, which is one of the vehicular cameras 2 except for the wide-angle camera 11 having the largest angular-field of view.

This configuration therefore enables the image recognition performance of the image processing apparatus 4 to be improved.

For example, let us assume that the vehicle V is changing the present lane on which the own vehicle V is travelling at a relatively high speed to another lane. At that time, the image processing apparatus 4 is capable of detecting, based on the image data captured by the telephoto camera 12, at least one other vehicle travelling ahead of the own vehicle V while simultaneously detecting, based on the image data captured by the wide-angle camera 11, at least one other vehicle travelling around the own vehicle V.

In this assumption, the image processing apparatus 4 is also capable of detecting, based on the image data captured by the telephoto camera 12, at least one other vehicle travelling ahead of the own vehicle V while simultaneously detecting, based on the image data captured by the wide-angle camera 11, lane markers, i.e. white lane marking lines, located around the own vehicle V to thereby determine whether the own vehicle V departs from a present travelling lane on which the own vehicle V is travelling.

Each of the imagers 11b and 12b of the wide-angle camera 11 and the telephoto camera 12 is, for example, a CMOS image sensor.

The image processing apparatus 4 is configured to change an image clip region, i.e. an image output region, from the light receiving surface RP1, RP2 of the CMOS image sensor of each of the cameras 11 and 12 in accordance with the vehicle speed Vv that has a positive correlation with respect to the image processing region of each of the cameras 11 and 12. Note that the negative correlation of the vehicle speed Vv with respect to the image processing region of each of the cameras 11 and 12 represents that a value of the speed-related deactivation threshold Vth1 increases stepwisely or sequentially as the image processing region of each of the cameras 11 and 12 increases.

This configuration makes it possible to reduce the number of pixels in the image processing region of the telephoto camera 12 in a situation where the vehicle speed Vv is relatively small, so that there is little or small need of detecting distant objects from the own vehicle V using the telephoto camera 12. This therefore reduces the amount of data processed in the telephoto camera 12, thus reducing the amount of heat generated by the telephoto camera 12.

Additionally, the image processing apparatus 4 is configured to reduce the number of pixels in the image processing region of the wide-angle camera 11 in a situation where the vehicle speed Vv is relatively small, so that there is small or little need of performing image processing using the wide-angle camera 11. This therefore reduces the amount of data processed in the wide-angle camera 11, thus reducing the amount of heat generated by the wide-angle camera 11.

The image processing apparatus 4 is configured to determine whether the own vehicle V is stopped. The image processing apparatus 4 is configured to increase the execution period of the image recognition routine to be longer upon the own vehicle V being determined to be stopped as compared with the execution period upon the own vehicle V being determined to be not stopped.

This configuration reduces the processing load of the image processing apparatus 4 in a situation where there is small or little need of performing the image processing routine, thus reducing the amount of heat generated by the image processing apparatus 4.

The image processing apparatus 4 is configured to obtain the acceleration of the own vehicle V represented by the acceleration measurement signal received from the acceleration sensor 22. Then, the image processing apparatus 4 is configured to set, based on the acceleration of the own vehicle V, a value of the speed-related deactivation threshold Vth1 such that the speed-related deactivation threshold Vth1 has a negative correlation with respect to the acceleration of the own vehicle V. Note that the negative correlation represents that a value of the speed-related deactivation threshold Vth1 decreases stepwisely or sequentially as the acceleration of the own vehicle V increases.

This configuration therefore prevents the occurrence of a case where the telephoto camera 12 is in a deactivated state although the vehicle speed Vv is rapidly increased.

The image processing apparatus 4 is configured to obtain the temperature of the telephoto camera 12 represented by the temperature measurement signal received from the temperature sensor 22, and determine whether the obtained temperature of the telephoto camera 12 is equal to or higher than the temperature-related deactivation threshold Vth2. The image processing apparatus 4 is configured to deactivate the telephoto camera 12 or maintain the deactivated state of the telephoto camera 12. This therefore reduces the amount of heat generated by the wide-angle camera 11.

The wide-angle camera 11 according to the exemplary embodiment serves as, for example, an imaging device having a largest angular field of view, and the photo camera 12 according to the exemplary embodiment serves as, for example, a target imaging device.

The CPU 41 serves as, for example, a deactivation controller to perform the operations in steps S30 to S50 and the operations in steps S90 to S110. The CPU 41 serves as, for example, an imaging processing region changer to perform the operations in steps S210 to S260, and serves as, for example, a stop determiner. The CPU 41 serves as, for example, a period changer to perform the operation in step S330.

MODIFICATIONS

The exemplary embodiment of the present disclosure has been described in detail, but the present disclosure is not limited to the exemplary embodiment, and can be variously modified.

First Modification

The image processing system 1 includes at least two cameras, such as the wide-angle camera 11 and the telephoto camera 12, constituting the vehicular cameras 2; one of the cameras is continuously activated while the image processing system 1 is activated. The present disclosure is however not limited to the configuration, and therefore the image processing system 1 according to a first modification can include at least a first camera, a second camera, and a third camera, which respectively have at least a first angular field of view, a second angular field of view, and a third angular field of view.

For example, the image processing apparatus 4 of the image processing system 1 according to the first modification can be configured to sequentially deactivate the second and third cameras in an ascending order.

Assuming that the first, second, and third angular fields of view are arranged in descending order, the image processing apparatus 4 of the first modification can set, in step S20, a first speed-related deactivation threshold for the first angular field of view of the first camera, a second speed-related deactivation threshold for the second angular field of view of the second camera, and a third speed-related deactivation threshold for the third angular field of view of the third camera such that 1. The first speed-related deactivation threshold is the smallest in all the first to third stop speed thresholds
2. The second speed-related deactivation threshold is smaller than the third speed-related deactivation threshold That is, if the own vehicle V is travelling at a speed higher than the first speed-related deactivation threshold, all the first to third cameras are activated.

At that time, if the temperature of each of the cameras is ignored, the CPU 41 of the image processing apparatus 4 can be configured to 1. Deactivate the third camera upon determining that the vehicle speed Vv decreases to become equal to or lower than the third speed-related deactivation threshold while activating the first camera (see steps S90 and S100)
2. Deactivate the second camera upon determining that the vehicle speed Vv decreases to become equal to or lower than the second speed-related deactivation threshold while activating the first camera (see steps S90 and S100)
3. Maintain the activated state of the first camera although the own vehicle V is stopped In other words, if the temperature of each of the cameras is ignored, the CPU 41 of the image processing apparatus 4 can be configured to 1. Activate the first camera while the own vehicle V is stopped
2. Activate the second camera upon determining that the vehicle speed Vv increases to become higher than the second speed-related deactivation threshold while activating the first camera (see steps S90 and S110)
3. Activate the third camera upon determining that the vehicle speed Vv increases to become higher than the third speed-related deactivation threshold while activating the first camera (see steps S90 and S110)

Second Modification

The image processing system 1 includes the wide-angle camera 11 and the telephoto camera 12 constituting the vehicular cameras 2. In addition, the image processing apparatus 4 is configured to deactivate the telephoto camera 12 upon the temperature Tc of the telephoto camera 12 being determined to be equal to or higher than the temperature-related deactivation threshold Tth2. The present disclosure is however not limited to the configuration, and therefore the image processing system 1 according to a second modification can include at least a first camera, a second camera, and a third camera, which respectively have at least a first angular field of view, a second angular field of view, and a third angular field of view.

For example, the image processing apparatus 4 of the image processing system 1 according to the second modification can be configured to have a first temperature-related deactivation threshold for the first angular field of view of the first camera, a second temperature-related deactivation threshold for the second angular field of view of the second camera, and a third temperature-related deactivation threshold for the third angular field of view of the third camera.

Assuming that the first, second, and third angular fields of view are arranged in descending order, the image processing apparatus 4 of the second modification can be configured to, if the condition of the vehicle speed Vv set forth above is ignored, 1. Deactivate the third camera upon determining that the temperature of the third camera becomes equal to or higher than the third temperature-related deactivation threshold while activating the first camera (see steps S90 and S100)

2. Deactivate the second camera upon determining that the temperature of the second camera becomes equal to or higher than the second temperature-related deactivation threshold while activating the first camera (see steps S90 and S100)

Third Modification

The image processing apparatus 4 of the image processing system 1 according to the exemplary embodiment is configured to 1. Reduce the image processing region of each of the wide-angle camera 11 and the telephoto camera 12 upon the vehicle speed Vv being determined to be equal to or lower than the corresponding one of the angular-field thresholds Vth3 and Vth4

2. Increase the image processing region of each of the wide-angle camera 11 and the telephoto camera 12 upon the vehicle speed Vv being determined to be higher than the corresponding one of the angular-field thresholds Vth3 and Vth4

The present disclosure is however not limited to this configuration.

Specifically, the image processing apparatus 4 of the image processing system 1 according to a third modification can be configured to stepwisely or sequentially increase the image processing region of each of the wide-angle camera 11 and the telephoto camera 12 as the vehicle speed Vv being determined to increase.

Fourth Modification

The image processing apparatus 4 of the image processing system 1 according to the exemplary embodiment is configured such that the speed-related deactivation threshold Vth1 is maintained constant before and after the vehicle speed Vv becomes higher than the speed-related deactivation threshold Vth1 (see YES or NO in step S30). The present disclosure is however not limited to this configuration.

Specifically, the image processing apparatus 4 according to a fourth modification can be configured such that 1. A negative-side hysteresis value is set to be slightly lower than a reference value of the speed-related deactivation threshold Vth1

2. A positive-side hysteresis value is set to be slightly higher than the reference value of the speed-related deactivation threshold Vth1

3. The determination in step S30 is affirmative upon the vehicle speed Vv decreasing to become equal to or lower than the negative-side hysteresis value 4. The determination in step S30 is negative upon the vehicle speed Vv increasing to become higher than the positive-side hysteresis value In other words, the image processing apparatus 4 according to the fourth modification can be configured such that the speed-related deactivation threshold Vth1 has predetermined hysteresis characteristics. Similarly, the temperature-related deactivation threshold Vth2 can have predetermined hysteresis characteristics.

Fifth Modification

The number of pixels of the imager 11b of the wide-angle camera 11 is set to be equal to the number of pixels of the imager 12b of the telephoto camera 12, but the present disclosure is not limited to this configuration.

Specifically, because a region to be imaged by the telephoto camera 12 is smaller than a region to be imaged by the wide-angle camera 11, the image processing apparatus 4 according to a fifth modification can be configured such that the number of pixels of the imager 12b of the telephoto camera 12 is set to be smaller than the number of pixels of the imager 11b of the wide-angle camera 11.

Sixth Modification

The image processing system 1 of the exemplary embodiment is provided with a plurality of cameras, such as the wide-angle camera 11 and the telephoto camera 12, and the image processing apparatus 4 of the exemplary embodiment is configured to change the image processing region of each of the plurality of cameras in accordance with the vehicle speed Vv, but the present disclosure is not limited thereto.

Specifically, the image processing system 1 according to a sixth modification of the exemplary embodiment can be provided with a single camera, and the image processing apparatus 4 of the sixth modification can be configured to change the image processing region of the single camera in accordance with the vehicle speed Vv.

Seventh Modification

The image processing apparatus 4 of the exemplary embodiment is configured to deactivate the telephoto camera 12 upon the temperature Tc of the telephoto camera 12 becoming equal to or higher than the temperature-related deactivation threshold Vth2 in step S100, but the present disclosure is not limited to this configuration.

Specifically, the image processing apparatus 4 according to a seventh modification can be configured to 1. Reduce the image processing region of the telephoto camera 12 to be smaller upon the temperature Tc of the telephoto camera 12 becoming equal to or higher than the temperature-related deactivation threshold Vth2, or 2. Increase a value of the execution period of the image processing routine to be longer upon the temperature Tc of the telephoto camera 12 becoming equal to or higher than the temperature-related deactivation threshold Vth2

Eighth Modification

The image processing apparatus 4 of the exemplary embodiment is configured to set the smaller image processing region and the larger image processing region on the light receiving surface of the imager of each of the cameras 11 and 12, and change the actual image processing region of the wide-angle camera 11 to one of the smaller image processing region and the larger image processing region (see steps S210 to S260), but the present disclosure is not limited to this configuration.

Specifically, the CPU 41 of the image processing apparatus 4 according to an eighth modification can be configured to change, in steps S210 to S260, an actual region of the digital frame image to be subjected to image processing to a smaller region corresponding to the small angular-field clip region RS1 or a larger region corresponding to the large angular-field clip region RB1. This configuration also reduces the processing load of the image processing apparatus 4 in a situation where there is small or little need of performing the image processing routine, thus reducing the amount of heat generated by the image processing apparatus 4. Note that the CPU 41 of the eighth modification serves as, for example a processing region changer to perform the operations in steps S210 to S260.

The image processing apparatuses and the image processing methods described in the present disclosure can be implemented by a dedicated computer including a memory and a processor programmed to perform one or more functions embodied by one or more computer programs.

The image processing apparatuses and image processing methods described in the present disclosure can also be implemented by a dedicated computer including a processor comprised of one or more dedicated hardware logic circuits.

The image processing apparatuses and image processing methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor. One or more functions included in each of the image processing apparatuses disclosed in the present disclosure can be implemented by one or more programmed logic circuits, one or more hardwired logic circuits, and/or one or more hardwired-logic and programmable-logic hybrid circuits.

The functions of one element in the above embodiment can be distributed as plural elements, and the functions that plural elements have can be combined into fewer elements. At least part of the structure of the above embodiment can be replaced with a known structure having the same function as the at least part of the structure of the embodiment. A part of the structure of the above embodiment can be eliminated. All aspects included in the technological ideas specified by the language employed by the claims constitute embodiments of the present disclosure.

The present disclosure can be implemented by various embodiments in addition to the image processing apparatus, such as the image processing apparatus 4, of the above embodiment; the various embodiments include systems each including the image processing apparatus, programs for serving as a computer as the image processing apparatus, storage media, such as non-transitory storage media, storing the programs, and image processing methods.

While the illustrative embodiment and its modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An image processing apparatus, communicable with at least first and second imaging devices installed on a vehicle, for performing an image processing task based on first image data and second image data, each of the first image data and second image data being obtained by a capture operation of the corresponding one of the first and second imaging devices with use of a corresponding one of first and second angular fields of view different from each other, the image processing apparatus comprising:

a vehicle speed obtainer configured to obtain vehicle speed information indicative of a speed of the vehicle; and a deactivation controller configured to:

determine whether the speed of the vehicle represented by the vehicle speed information is equal to or lower than a speed-related deactivation threshold previously determined for a target device, the target device being a selected one of the first and second imaging devices, the selected one of the first and second imaging devices having one of the first and second angular fields of view being smaller than the other of the first and second angular fields of view; and deactivate the capture operation of the target device upon determination that the speed of the vehicle represented by the vehicle speed information is equal to or lower than the speed-related deactivation threshold previously determined for the target device, wherein a third imaging device is installed in the vehicle in addition to the at least first and second imaging devices, the third imaging device being configured to obtain, by a capture operation, third imaging data with use of a third angular field of view, the first angular field of view being a largest in all the first to third angular fields of view, the second angular field of view being larger than the third angular field of view, the second imaging device being a first target device as the target device, the third imaging device being a second target device as the target device, wherein the speed-related deactivation threshold includes first and second speed-related deactivation thresholds being respectively for the first and second target devices, a change between the first speed-related deactivation threshold for the first target device and the second speed-related deactivation threshold for the second target device has a negative correlation with respect to a change between the first and second angular field of views, and the deactivation controller is configured to:

determine whether the speed of the vehicle represented by the vehicle speed information is equal to or lower than each of the first and second speed-related deactivation thresholds; and deactivate the capture operations of the first and second target devices in an order of the second target device and the first target device in accordance with a result of determination of whether the speed of the vehicle represented by the vehicle speed information is equal to or lower than each of the first and second speed-related deactivation thresholds while the speed of the vehicle decreases.

2. The image processing apparatus according to claim 1, wherein:

the deactivation controller is configured to deactivate the capture operations of the first and second target devices in the order of the second target device and the first target device while activating the first imaging device.

3. The image processing apparatus according to claim 1, wherein:

the image processing apparatus is configured to perform the image processing task based on a predetermined image processing region included in each of the first image data and the second image data, the speed of the vehicle has a positive correlation with respect to the image processing region included in each of the first image data and the second image data; and each of the first and second imaging devices comprises an imager having a light receiving surface for converting input light into image data, the image processing apparatus further comprising:
an output region changer configured to:
determine whether the speed of the vehicle represented by the vehicle speed information is equal to or lower than a predetermined angular-field threshold previously determined for the target device; and
change a predetermined readout region in the light receiving surface area of the target device from which the corresponding one of the first image data and the second image data is to be read out in accordance with whether the speed of the vehicle represented by the vehicle speed information is equal to or lower than the angular-field threshold.

4. The image processing apparatus according to claim 1, wherein:
the image processing apparatus is configured to perform the image processing task based on a predetermined image processing region included in each of the first image data and the second image data, the speed of the vehicle has a positive correlation with respect to the image processing region included in each of the first image data and the second image data,
the image processing apparatus further comprising:
a processing region changer configured to:
determine whether the speed of the vehicle represented by the vehicle speed information is equal to or lower than a predetermined angular-field threshold previously determined for the target device; and
change the predetermined image processing region included in each of the first image data and the second image data in accordance with whether the speed of the vehicle represented by the vehicle speed information is equal to or lower than the angular-field threshold.

5. An image processing apparatus, communicable with at least first and second imaging devices installed to on a vehicle, for performing an image processing task based on first image data and second image data, each of the first image data and second image data being obtained by a capture operation of the corresponding one of the first and second imaging devices with use of a corresponding one of first and second angular fields of view different from each other, the image processing apparatus comprising:
a vehicle speed obtainer configured to obtain vehicle speed information indicative of a speed of the vehicle; and
a deactivation controller configured to:
determine whether the speed of the vehicle represented by the vehicle speed information is equal to or lower than a speed-related deactivation threshold previously determined for a target device, the target device being a selected one of the first and second imaging devices, the selected one of the first and second imaging devices having one of the first and second angular fields of view being smaller than the other of the first and second angular fields of view; and
deactivate the capture operation of the target device upon determination that the speed of the vehicle represented by the vehicle speed information is equal to or lower than the speed-related deactivation threshold previously determined for the target device, wherein:
the image processing apparatus is configured to perform the image processing task every predetermined period,
the image processing apparatus further comprising:
a stop determiner configured to determine whether the vehicle is stopped; and
a period changer configured to set a value of a period of the image processing task to be longer upon the vehicle being determined to be stopped than a value of the period of the image processing task upon the vehicle being determined to be not stopped.

6. The image processing apparatus according to claim 1, further comprising:
an acceleration obtainer configured to obtain acceleration information indicative of acceleration acting on the vehicle; and
a threshold setter configured to set the speed-related deactivation threshold such that the speed-related deactivation threshold has a negative correlation with respect to the acceleration represented by the acceleration information.

7. The image processing apparatus according to claim 1, further comprising:
a temperature obtainer configured to obtain temperature information indicative of a temperature of the target device; and
a temperature deactivation controller configured to deactivate the capture operation of the target device upon determination that the temperature of the target device represented by the temperature information is equal to or higher than a predetermined temperature-related deactivation threshold.

8. The image processing apparatus according to claim 1, wherein:
the negative correlation of the change between the first speed-related deactivation threshold for the first target device and the second speed-related deactivation threshold for the second target device with respect to the change between the first and second angular field of views represents that:
the change between the first speed-related deactivation threshold for the first target device and the second speed-related deactivation threshold for the second target device becomes negative as the change between the first and second angular field of views becomes positive.

9. A non-transitory computer-readable storage medium comprising a set of computer program instructions for a computer applicable to an image processing apparatus communicable with at least first and second imaging devices installed on a vehicle, the image processing apparatus being configured to perform an image processing task based on first image data and second image data, each of the first image data and second image data being obtained by a capture operation of the corresponding one of the first and second imaging devices with use of a corresponding one of first and second angular fields of view different from each other, the instructions causing a computer to carry out:
a first step of obtaining vehicle speed information indicative of a speed of the vehicle;
a second step of determining whether the speed of the vehicle represented by the vehicle speed information is equal to or lower than a speed-related deactivation threshold previously determined for a target device, the target device being a selected one of the first and second imaging devices, the selected one of the first and second imaging devices having one of the first and second angular fields of view smaller than the other of the first and second angular fields of view; and a third step of deactivating the capture operation of the target device upon determination that the speed of the vehicle represented by the vehicle speed information is equal to or lower than the speed-related deactivation threshold previously determined for the target device, wherein a third imaging device is installed in the vehicle in addition to the at least first and second imaging devices, the third imaging device being configured to obtain, by a capture operation, third imaging data with use of a third angular field of view, the first angular field of view being a largest in all the first to third angular fields of view, the second angular field of view being larger than the third angular field of view, the second imaging device being a first target device as the target device, the third imaging device being a second target device as the target device, wherein the speed-related deactivation threshold includes first and second speed-related deactivation thresholds being respectively for the first and second target devices, a change between the first speed-related deactivation threshold for the first target device and the second speed-related deactivation threshold for the second target device has a negative correlation with respect to a change between the first and second angular field of views, and the instructions further cause a computer to carry out:

determine whether the speed of the vehicle represented by the vehicle speed information is equal to or lower than each of the first and second speed-related deactivation thresholds; and deactivate the capture operations of the first and second target devices in an order of the second target device and the first target device in accordance with a result of determination of whether the speed of the vehicle represented by the vehicle speed information is equal to or lower than each of the first and second speed-related deactivation thresholds while the speed of the vehicle decreases.

* * * * *